(12) United States Patent
Pryor et al.

(10) Patent No.: US 7,874,246 B2
(45) Date of Patent: Jan. 25, 2011

(54) FOOD STACK ALIGNING DEVICE FOR CONVEYOR

(75) Inventors: Glen F. Pryor, Tinley Park, IL (US); Scott A. Lindee, Mokena, IL (US)

(73) Assignee: Formax, Inc., Mokena, IL (US)

(*) Notice: Subject to any disclaimer, the term of this patent is extended or adjusted under 35 U.S.C. 154(b) by 1176 days.

(21) Appl. No.: 11/454,144

(22) Filed: Jun. 15, 2006

(65) Prior Publication Data

US 2007/0089967 A1    Apr. 26, 2007

Related U.S. Application Data

(60) Provisional application No. 60/729,959, filed on Oct. 25, 2005.

(51) Int. Cl.
*B65G 47/00* (2006.01)
*B65G 47/29* (2006.01)

(52) U.S. Cl. .................... 99/537; 198/345.1; 198/419.1

(58) Field of Classification Search ....................... None
See application file for complete search history.

(56) References Cited

U.S. PATENT DOCUMENTS

| | | | | |
|---|---|---|---|---|
| 3,527,333 | A | * | 9/1970 | Sorensen et al. ............. 198/458 |
| 4,136,763 | A | * | 1/1979 | Pryor et al. ................ 193/35 A |
| 4,166,525 | A | | 9/1979 | Bruno |
| 4,184,579 | A | * | 1/1980 | Kantarian et al. .......... 193/35 A |
| 4,281,757 | A | | 8/1981 | Morton |
| 4,509,891 | A | * | 4/1985 | Lipscomb ................. 414/795.7 |
| 4,565,704 | A | * | 1/1986 | Dagerskog et al. ........... 426/233 |
| 4,662,152 | A | | 5/1987 | Simelunas et al. |
| 4,846,336 | A | | 7/1989 | Hoyland et al. |
| 5,078,255 | A | | 1/1992 | Haley |
| 5,101,957 | A | * | 4/1992 | Schiek ..................... 198/419.1 |
| 5,207,311 | A | * | 5/1993 | Terai ........................ 198/419.1 |
| 5,303,811 | A | * | 4/1994 | Haley ....................... 198/419.1 |
| 5,421,714 | A | * | 6/1995 | Morikawa et al. ............ 425/321 |
| 5,810,149 | A | | 9/1998 | Sandberg et al. |
| 6,087,623 | A | * | 7/2000 | Kwon et al. ............... 198/419.1 |
| 6,131,372 | A | * | 10/2000 | Pruett ....................... 198/419.1 |
| 6,152,284 | A | | 11/2000 | Sandberg et al. |
| 6,193,047 | B1 | * | 2/2001 | Brumm et al. ............ 198/345.1 |
| 6,484,615 | B2 | | 11/2002 | Lindee |
| 6,523,671 | B2 | * | 2/2003 | McTaggart et al. ........ 198/459.6 |
| 6,854,582 | B1 | | 2/2005 | Pryor |
| 2006/0037839 | A1 | | 2/2006 | Ward |

FOREIGN PATENT DOCUMENTS

| FR | 2168967 | 9/1973 |
|---|---|---|
| FR | 2587007 | 3/1987 |

* cited by examiner

*Primary Examiner*—Joseph M Pelham
(74) *Attorney, Agent, or Firm*—Erickson Law Group, PC

(57) ABSTRACT

A food product alignment device for a conveyor includes a plurality of upright pins that act in pin pairs to align respective food products that approach the pin pairs on a moving conveyor. Particularly for round food products or food product stacks, a misaligned round food product will slightly pivot on the moving conveyor when contacting a first pin to be evenly positioned between the two pins of the respective pin pair. The pins are retractable to a position beneath the conveyor after the food products are aligned to allow the aligned food products to continue proceeding on the conveyor.

17 Claims, 5 Drawing Sheets

FOOD STACK ALIGNING DEVICE FOR CONVEYOR

This application claims the benefit of U.S. Provisional Application Ser. No. 60/729,959 filed Oct. 25, 2005.

TECHNICAL FIELD OF THE INVENTION

The present invention is directed to food processing and packaging, and particularly to a device for aligning rows and columns of food products on a conveyor.

BACKGROUND OF THE INVENTION

Food loaves come in a variety of shapes (round, square, rectangular, oval, etc.), cross-sections, and lengths. Such loaves are made from various comestibles, such as meat, cheese, etc. Most loaves are provided to an intermediate processor who slices and packages the products in groups for retail.

A variety of machines have been developed to slice such loaves. One such machine is an FX180™ or the FX Plus™ available from Formax, Inc., of Mokena, Ill. The FX180™ and the FX Plus™ machines are high speed food loaf slicing machines that slice one, two, or more food loaves simultaneously using one cyclically driven slicing blade. Independent loaf feed drives are provided so that slices cut from one loaf may vary in thickness from slices cut from the other loaf. The machine includes a slicing station that is enclosed by a housing, except for a limited slicing opening. The slicing blade is disposed in the slicing station and a drive rotates the slicing blade at a predetermined cyclical rate on a cutting path through a slicing range that intersects the food loaves as they are fed into the slicing station.

In the foregoing machine, the food loaf slices are received in groups of predetermined weight on a receiving conveyor that is disposed adjacent the slicing blade. The receiving conveyor receives the slices as they are cut by the slicing blade. In many instances, neatly aligned stacked groups are preferred and, as such, the sliced product is stacked on the receiving conveyor before being transferred from the machine. In other instances, the groups are shingled so that a purchaser can see a part of every slice through a transparent package. In these other instances, conveyor belts of the receiving conveyor are gradually moved during the slicing process to separate the slices.

Conveyor systems are used for a wide range of purposes. One such purpose is the formatting of one or more streams of product so that, for example, the product spacing corresponds to the spacing needed for a subsequent operation. Such conveyor systems are used, for example, to convert one or two output streams of stacked or shingled meat from a slicing machine into the format required by a packaging machine. Depending on the required format, the conveyor must combine two or more separate streams into a single output stream or multiply the streams into a larger number of output streams. Additionally, the conveyor must properly space the product along both the length and the width of the conveyor to ensure compatibility with the packaging machine.

Conventional conveyor systems for changing the number of streams of product usually include a simple flat belt conveyor and a series of fixed curbs or built conveyors which guide the products in the lateral direction of the belt conveyor to merge two streams into one or to multiply the number of streams. Examples of these conventional conveying systems are described in FR-A-2587007 and FR-A-2168967.

Another conveyor system specifically adapted for formatting meat products is shown in U.S. Pat. No. 4,846,336. The '336 patent is purportedly directed to a conveyor system for positioning slices of meat by converting M input streams of product into N output streams of products where M is an integer greater than one and N is an integer not equal to M. The system includes an input conveyor for conveying M input streams and an output conveyor for conveying N output streams. It also includes a multi-element strip conveyor having its upstream input end arranged to receive products from an input stream and having its downstream end arranged to continuously move laterally throughout the formatting process to deposit products from the input stream to form an output stream shifted laterally with respect to the input stream.

U.S. Pat. No. 5,810,149 discloses a conveyor system for accepting one or more streams of product input and converting the one or more streams to a format that is suitable for automatic loading to a subsequent machine, such as a packaging machine.

In order to ensure accurate and reliable packaging it is advantageous that the groups of slices are arranged in a precise pattern or format. As described in U.S. Pat. No. 6,484,615, as food product loaves are sliced by a rotating blade, the slices removed are propelled or thrown with a trajectory to the receiving conveyor below.

The present inventors have recognized that varying temperature and varying firmness of the loaves being cut will affect the trajectory of the slices from the loaves to the receiving conveyor. These parameters can vary throughout the production day. When the resulting trajectory varies, the stack or shingled group will be located at a variable position on the receiving conveyor and will be shifted in position in the packaging format further down the conveyor line. It is difficult to manually compensate for this varying format throughout the production day.

The present inventors have recognized that it would be desirable to provide a mechanism that reliably corrected for misalignment of food products, such as stacks or shingled groups of slices on a conveyor, particularly on a conveyor between a food processing apparatus and a packaging apparatus.

SUMMARY OF THE INVENTION

The present invention provides a product alignment device that aligns rows and or columns of food product or stack streams on a conveyor. The product alignment device is particularly suited to align round food products or stacks of sliced food product between a high speed food slicing apparatus and a packaging machine.

According to a preferred embodiment of the invention, a food product aligning device for a conveyor comprises a frame, a plurality of conveying surfaces for conveying a plurality of streams of spaced apart food products in parallel lanes along a longitudinal direction, wherein the plurality of conveying surfaces are supported by the frame. At least one stop is associated with each lane, the respective conveying surface movable independently of the stop. The at least one stop is movable from a first position of non-interference with the food product conveyed on the respective conveying surface to a second position of interference with the food products conveyed on the respective conveying surface to halt conveying of the food products on the respective conveying surface. At least one actuator is operatively connected to the stops to move the stops between the first and second positions.

A control is operatively connected to the at least one actuator to effect movement of the stops with respect to the respective conveying surfaces.

Preferably, the at least one stop of each the lane is movable together with the stops associated with the respective other lanes.

Preferably, a sensor is in signal communication with the control and operative to sense the proximity of food products approaching the stops on the conveying surfaces.

Preferably, a member, such as a rod, extends laterally and is connected to a base end of all of the stops. The actuator can comprise a pressurized fluid device having a cylinder and an extendable rod therefrom. The cylinder and the rod are operatively connected between the frame and the member, the member being rotatable about an axis thereof by extension position of the rod with respect to the cylinder. The stops are rotatable via the member between the first position to the second position.

Preferably, the control comprises a timer for moving the stops from the second position to the first position.

Preferably, the stops are located below the conveying surfaces when in the first position and at least partially above the conveying surfaces when in the second position.

Preferably, the stops are arranged to rotate between the first and second positions.

According to a preferred embodiment of the invention, the stops of the product alignment device comprises a plurality of upright pins that act in pin pairs to align respective stacks that approach the pin pairs on a moving conveyor. Particularly for round stacks, a misaligned round stack will slightly pivot on the moving conveyor when contacting a first pin to be evenly positioned between the two pins of the respective pin pair. The pins are retractable to a position beneath the conveyor after the stacks are aligned to allow the aligned stacks to continue proceeding on the conveyor.

According to the preferred embodiment, an optical sensor senses the stacks approaching the alignment device, whereupon the machine control actuates an actuator to raise the pins from beneath the conveyor to the upright position. After a predetermined time the actuator is reversed by the machine control and the pins are retracted to allow the aligned stacks to proceed on the moving conveyor.

As a result of the alignment device, the aligned stacks that proceed on the conveyor can be accumulated in a precisely arranged format for packaging, or other processing.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENT

Figure 1:
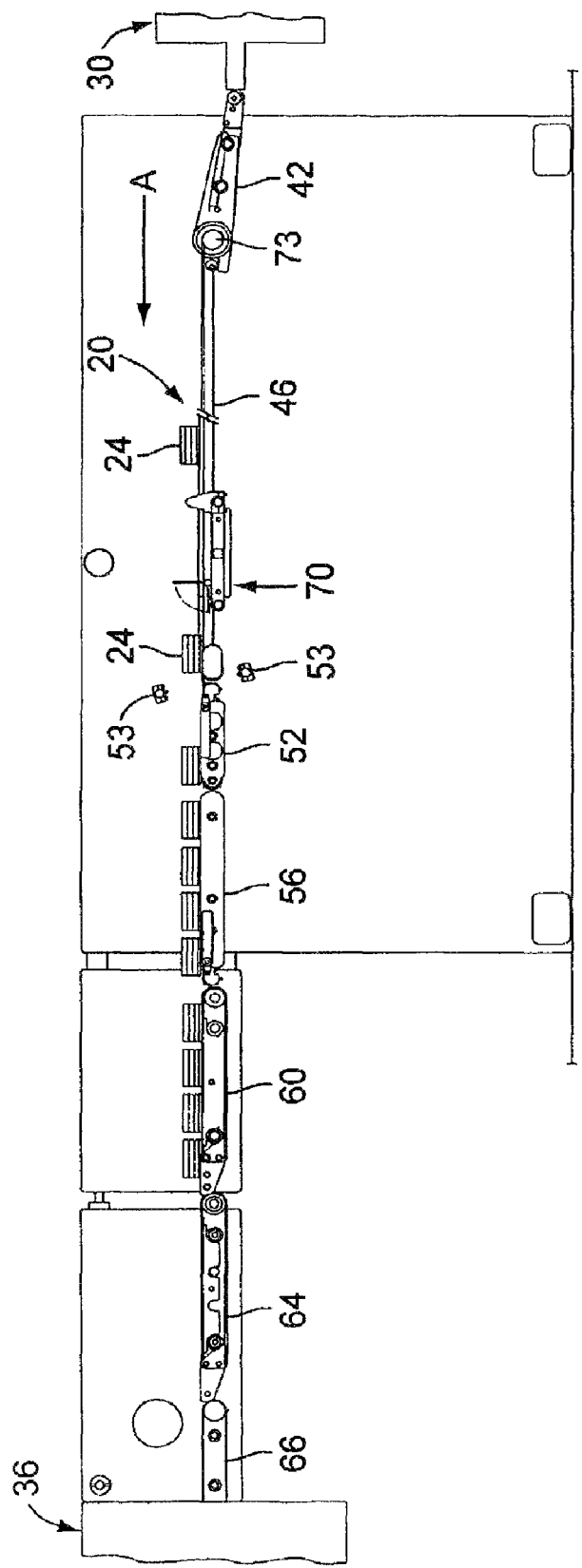
FIG. 1 is an elevational view of a conveyor arrangement incorporating a food product alignment device of the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a conveyor arrangement 20 that incorporates the present invention. The conveyor arrangement receives stacks 24 of food slices in a longitudinal succession from a high-speed slicing apparatus 30 (shown schematically), proceeding in a direction "A". One or more conveyors transport the stacks 24 in the direction "A" to a packaging station 36 (shown schematically). The packaging station can be part of a packaging machine such as a MULTIVAC R530, available from Multivac, Inc. of Kansas City, Mo., U.S.A.

Although stacks of sliced food product are described, the device of the invention could be used to align single food products and in that sense the term food product could refer to either a stack of food product slices or a single food product mass.

The conveyor system 20 illustrated accepts one or more streams of stacks from the slicing machine 30 and arranges the stacks in the proper format for acceptance by the packaging machine 36. Different packages require different stack formats at the packaging machine input. In the illustrated embodiment, the formats correspond to the lateral and longitudinal spacing of the packages that are filled with the stacks by the packaging machine 36.

In the illustrated embodiment, a first conveyor 42 transports the stacks 24 onto a second conveyor 46, that transports the stacks 24 onto a third conveyor 52, that transports the stacks 24 onto a fourth conveyor 56, that transports the stacks 24 onto a fifth conveyor 60, that transports the stacks 24 onto a sixth conveyor 64, that transports the stacks onto a seventh conveyor 66, that transports the stacks to the packaging station 36.

A product alignment device 70 is mounted to the second conveyor 46. The product alignment device 70 properly aligns and spaces the stacks for transporting the stacks in the proper format onto the subsequent third conveyor 52. The third conveyor 52 can include an optical detector arrangement 53 and controls for further longitudinal alignment of the stacks if needed. The conveyor 52 receives one row of aligned stacks 24d, 24e, 24f from the conveyor 46 and moves that row onto the conveyor 56 which is an accumulation conveyor. The conveyors 64 and 66 are also accumulation conveyors. Once the accumulation conveyors have been filled with the desired format they are circulated to transport the format onto the next conveyor or to the packaging station or machine 36. The desired format of the stacks is eventually presented to the packaging machine 36 wherein the format corresponds to a format or layout of packages which receive the stacks.

Figure 2:
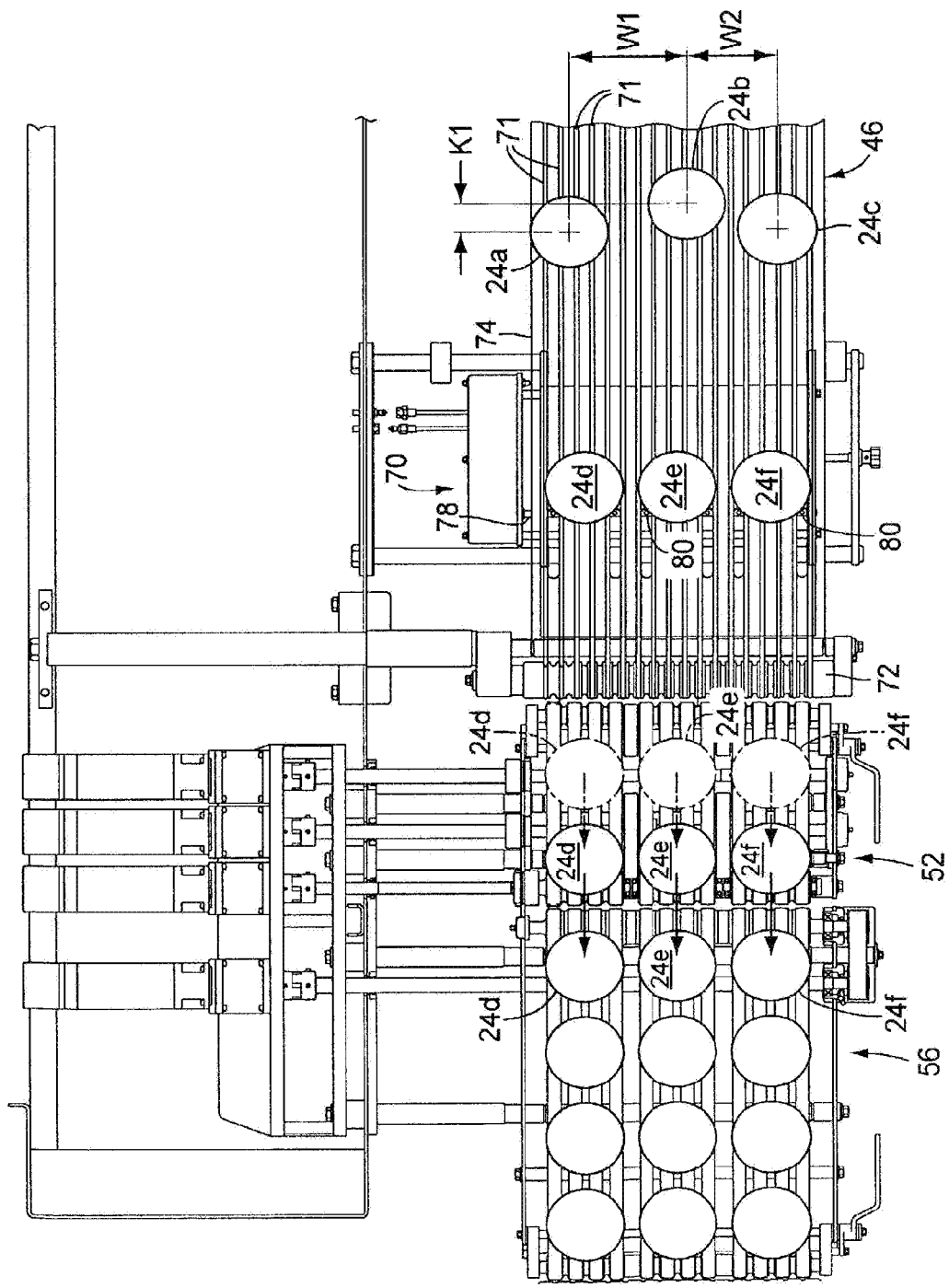
FIG. 2 is an enlarged fragmentary plan view of the conveyor arrangement of FIG. 1.

As seen in FIG. 2 the conveyor 46 comprises a plurality of spaced apart belts or bands 71 that are tightly wrapped around a tension roller 72 and a drive roller 73 (FIG. 1). A support plate 74 is located between the rollers 72, 73 and between upper and lower runs of the belts 71. Stacks 24a, 24b, 24c proceeding on conveyor 46 can be misaligned longitudinally and laterally. A longitudinal misalignment k1 and a lateral misalignment, equal to the difference between the distances between columns w1 and w2, are illustrated. The alignment device 70 aligns stacks 24a, 24b, 24c longitudinally and laterally as desired. In the illustrated embodiment an evenly spaced lateral alignment and a collinear longitudinal alignment is desired. The aligned stacks are designated 24d, 24e, 24f.

Figure 3:
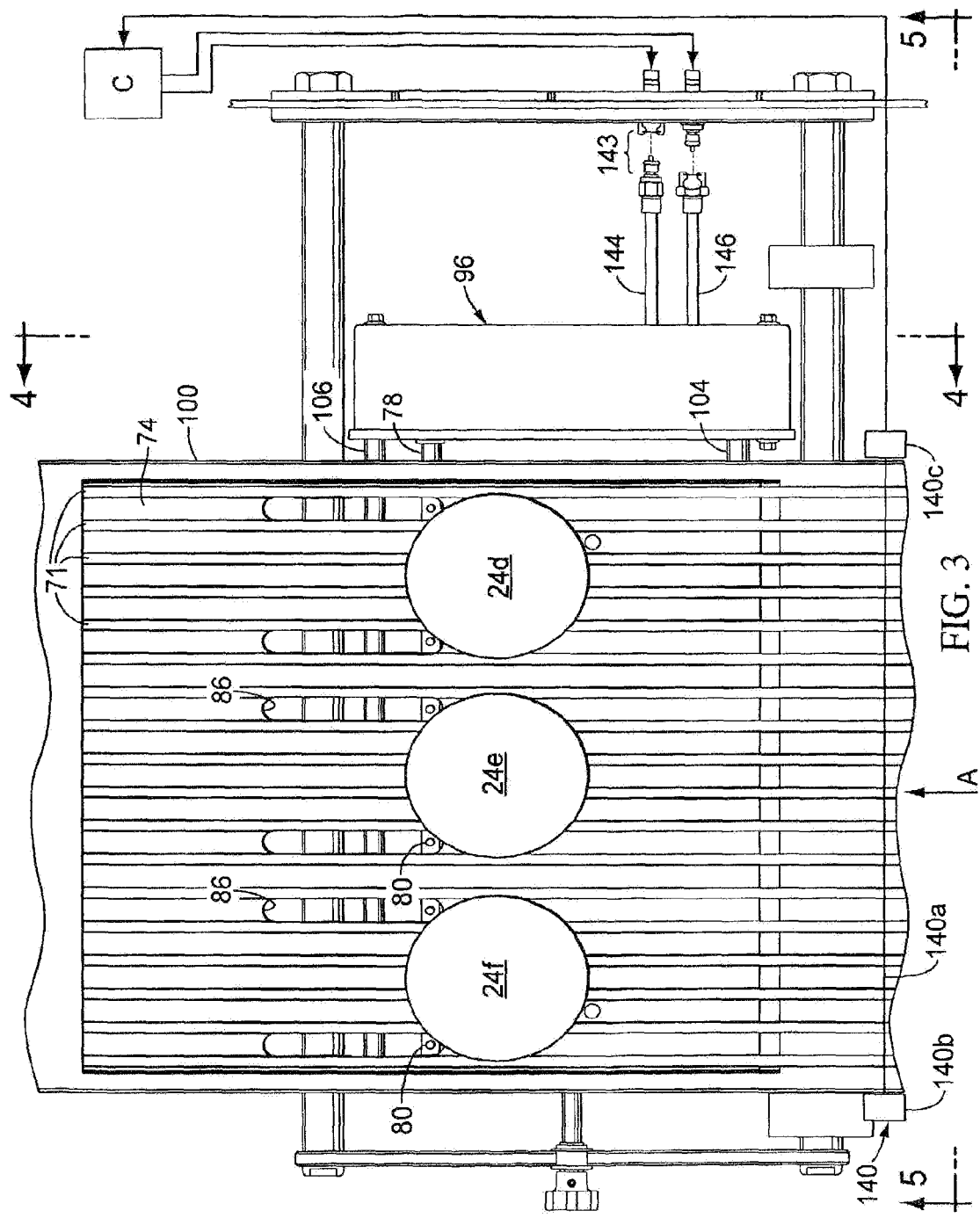
FIG. 3 is an enlarged fragmentary plan view taken from FIG. 2.

As illustrated in FIG. 3, the alignment device 70 comprises a rotatable rod 78 and a plurality of pins 80 extending radially from the rod 78. The pins 80 are each arranged between adjacent belts 71 and each within an oblong opening 86 formed in the plate 74. The rotatable rod 78 is driven by a pneumatic device 96 that is mounted to a conveyor frame 100, by rods 104, 106. The pneumatic device 96 is connected to pneumatic lines 144, 146. The pneumatic lines 144, 146 are functionally connected via quick disconnect fittings 143 (shown disconnected for description purposes) to a machine control "C." A photo sensor assembly 140 is also functionally connected to the machine control C.

Figure 4:
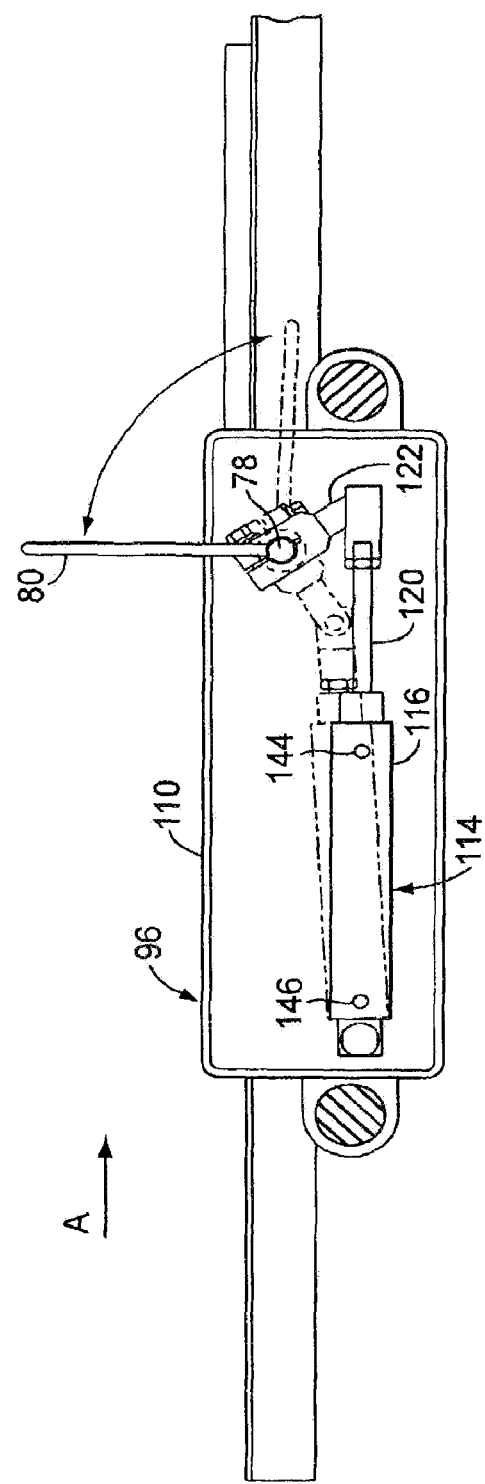
FIG. 4 is a sectional view taken along line 4-4 of FIG. 3.

FIG. 4 illustrates the pneumatic device 96 includes a substantially enclosed housing 110 that houses a pneumatic actuator 114. The actuator 114 comprises a bidirectional acting cylinder 116, connected to the pneumatic lines 144, 146, that acts on an extendable and retractable rod 120. The pneumatic lines 144, 146 selectively pressurize the cylinder on opposite sides of a piston therein that is connected to the rod 120. The rod 120 is pivotally connected to a lever 122 that is clamped tightly to the rotatable rod 78 such that the lever 122 and the rod 120 must rotate together. The pins 80 are rigidly fastened to the rod 78. The pins 80 can be fastened to the rod 78 by welding or by providing radially extended tapped holes in the rod 78 and threaded base ends on the pins 80 that are threaded into the tapped holes.

FIG. 4 illustrates two positions of the pins: a deployed, upright position shown in solid lines, and a retracted position shown in dashed lines. For deployment of the pins 80, the rod 120 is extended from the cylinder 116 and the lever 122 and pins 80 pivot counterclockwise. For retraction of the pins 80, the rod 120 is retracted into the cylinder 116 and the lever 122, rods 78 and the pins 80 pivoted clockwise. The pins 80 can pass through the plate 74 through the oblong openings 86.

Figure 5:
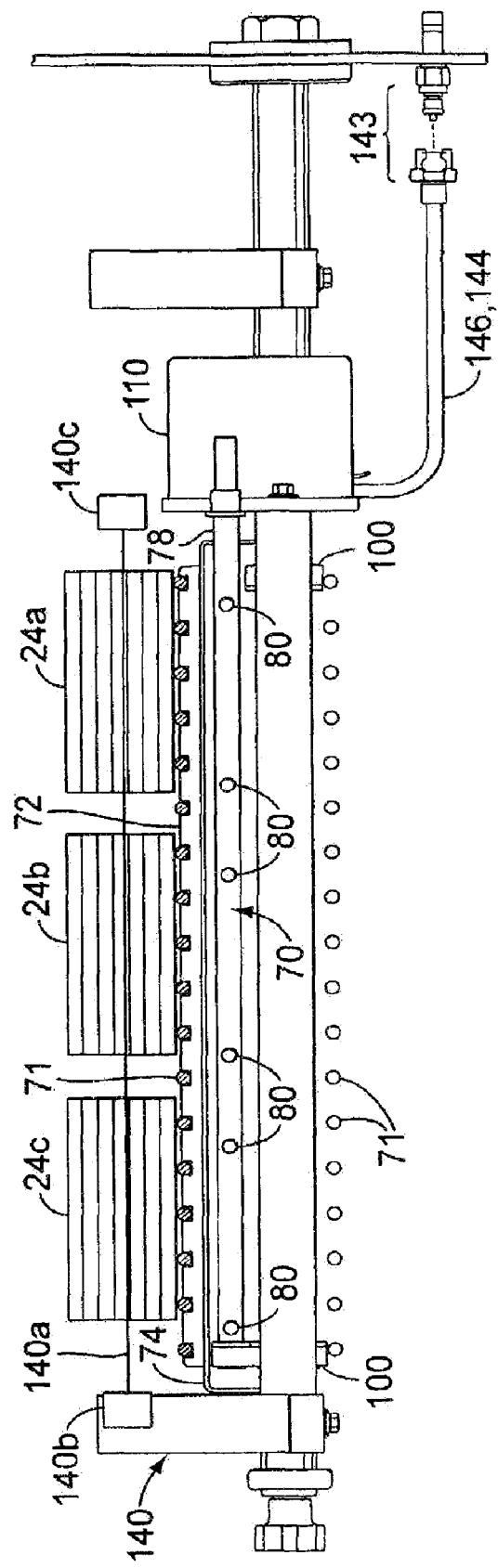
FIG. 5 is a sectional view taken generally along line 5-5 of FIG. 3, but showing misaligned food product stacks approaching the alignment device with the alignment device in a retracted orientation.

In operation, three misaligned stacks 24a, 24b, 24c approach the alignment device 70 (FIG. 5). The pins 80 are in a retracted position beneath the plate 74. The photo sensor assembly 140 (FIGS. 3 and 5) generates a light beam 140a between a light emitter 140b and a light sensor 140c that is interrupted and thus senses the approach of the stacks 24a, 24b, 24c and sends the signal to a machine control "C" (FIG. 3). The machine control C controls, through appropriate electronic and pneumatic circuits, the pneumatic lines 144, 146 connected to the cylinder 116 that control extension or retraction of the rod 120. When the approaching stacks are sensed, the machine control C causes the actuator 114 to extend the rod 120 from the cylinder 116 to deploy the pins 80 to an upright orientation.

The belts 71 transport each stack into initial contact with at least one pin 80 of the corresponding pin pair, wherein any misaligned stack will contact first the one pin 80 of the corresponding pin pair. The misaligned stack will then slightly pivot on the belts 71, given the offset force couple of the contact of the stack with the one pin 80 and continued longitudinal force of the moving belts 71, until both pins 80 of the respective pin pair are contacted by the stack, and the stack is aligned. After a predetermined short time, the machine control C causes the actuator 114 to be reversed to retract the rod 120, and the pins 80 are pivoted clockwise, downwardly, to allow the stacks to continue to be transported in the direction A, now aligned in the desired format.

Although the preferred embodiment is described herein in a system including the packaging machine 36 and the slicing machine 30, it will be recognized that the alignment device 70 can be used in connection with other types of product supplies and product outputs.

Numerous modifications may be made to the foregoing system without departing from the basic teachings thereof. Although the present invention has been described in substantial detail with reference to one or more specific embodiments, those of skill in the art will recognize that changes may be made thereto without departing from the scope and spirit of the invention as set forth in the appended claims.

The invention claimed is:

1. A food product aligning device for aligning round food products on a conveyor, comprising:
   a frame;
   a plurality of conveying surfaces for conveying a plurality of streams of spaced apart food products in parallel lanes along a longitudinal direction, said plurality of conveying surfaces supported by said frame;
   at least one stop associated with each lane, wherein said at least one stop comprises a pair of pins, said respective conveying surface movable independently of said stop, said at least one stop being movable from a first position of non-interference with the food product conveyed on said respective conveying surface to a second position of interference with the food products conveyed on said respective conveying surface to halt conveying of the food products on said respective conveying surface wherein the first position is substantially parallel to the conveying surface;
   at least one actuator operatively connected to said stops to move said stops between said first and second positions; and
   a control operatively connected to said at least one actuator to effect movement of said stops with respect to said respective conveying surfaces.

2. The food product aligning device according to claim 1, wherein said at least one stop associated with each conveying surface comprises a pair of pins, said pins of said pair arranged adjacent to opposite lateral sides of said respective conveying surface.

3. The food product aligning device according to claim 1, wherein said at least one stop of each said lane is movable together with the stops associated with said respective other lanes.

4. The food product aligning device according to claim 1, comprising a sensor in signal communication with said control and operative to sense the proximity of food products approaching said stops on said conveying surfaces.

5. The food product aligning device according to claim 1,
   comprising a member extending laterally with respect to the longitudinal direction and connected to a base end of all of said stops;
   wherein said actuator comprises a pressurized fluid device having a cylinder and an extendable rod therefrom, said cylinder and said rod operatively connected between said frame and said member, said member rotatable about an axis thereof by extension position of said rod with respect to said cylinder;
   wherein said stops are rotatable via said member between said first position to said second position.

6. The food product aligning device according to claim 5, comprising a lever connected between said rod and said member.

7. The food product aligning device according to claim 5, wherein said at least one stop associated with each conveying surface comprises a pair of pins, said pins of said pair arranged adjacent to opposite lateral sides of said respective conveying surface;

wherein said at least one pin of each said conveying surface is movable together with the pins associated with said respective other lanes;

comprising a sensor in signal communication with said control and operative to sense the proximity of food products approaching said pins on said conveying surfaces.

8. The food product aligning device according to claim 1, wherein said at least one stop associated with each conveying surface comprises a pair of pins, said pins of said pair arranged adjacent to opposite lateral sides of said respective conveying surface, said pair of pins spaced apart at a pre-selected distance to align a round food product of a pre-selected diameter to a pre-selected longitudinal position along the longitudinal direction on the conveying surface.

9. The food product aligning device according to claim 8, wherein said pair of pins of each said lane is movable together with the pairs of pins of the respective other lanes.

10. The food product aligning device according to claim 1, wherein said control comprises a timer for moving said stops from said second position to said first position.

11. The food product aligning device according to claim 1, wherein said stops are located below said conveying surfaces when in said first position and at least partially above said conveying surfaces when in said second position.

12. The food product aligning device according to claim 11, wherein said stops are arranged to rotate between said first and second positions.

13. The food product aligning device according to claim 1, wherein said stops are arranged to rotate between said first and second positions.

14. The food product aligning device according to claim 13, wherein said at least one stop associated with each conveying surface comprises a pair of pins, said pins of said pair arranged adjacent to opposite lateral sides of said respective conveying surface and spaced apart less than a lateral width of the food product conveyed on said respective conveying surface.

15. The food product aligning device according to claim 13, wherein said stops are arranged adjacent to opposite lateral sides of said respective conveying surface and spaced apart less than a lateral width of the food product conveyed on said respective conveying surface.

16. A food product aligning device for aligning round food products on a conveyor, comprising:

a frame;

a plurality of conveying surfaces for conveying a plurality of streams of spaced apart food products in parallel lanes along a longitudinal direction, said plurality of conveying surfaces supported by said frame;

a pair of aligning stops associated with each lane, said respective conveying surface movable independently of said aligning stops, said pair of aligning stops being rotatable from a first position of non-interference with the food product conveyed on said respective conveying surface to a second position to guide laterally and stop longitudinally the food products conveyed on said respective conveying surface;

at least one actuator operatively connected to said stops to rotate said stops between said first and second positions, wherein said actuator rotates said stops from the second position to the first position by rotating the stops so that the longitudinal component of their motion is only in a downstream direction; and a control operatively connected to said at least one actuator to effect movement of said stops with respect to said respective conveying surfaces.

17. The food product aligning device according to claim 16, wherein said stops are located below said conveying surfaces when in said first position and at least partially above said conveying surfaces when in said second position.

* * * * *